358-86. OR 3,882,266 SR

United States Patent [19]

Walding

[11] 3,882,266

[45] May 6, 1975

[54] APPARATUS FOR CONVERTING SELECTED CHANNELS

[75] Inventor: Eugene C. Walding, Arlington Heights, Ill.

[73] Assignee: Oak Industries, Inc., Sycamore, Ill.

[22] Filed: Jan. 11, 1973

[21] Appl. No.: 322,852

[52] U.S. Cl. .......... 178/5.1; 178/DIG. 13; 325/308; 325/432; 325/461

[51] Int. Cl. .......... H04n 1/44

[58] Field of Search .......... 325/308, 30, 431, 432, 325/461; 178/DIG. 13, 5.1

[56] References Cited

UNITED STATES PATENTS

| | | | |
|---|---|---|---|
| 3,333,198 | 7/1967 | Mandell et al. | 325/308 |
| 3,562,650 | 2/1971 | Gossard et al. | 325/308 |
| 3,643,164 | 2/1972 | Sly | 325/308 |
| 3,730,980 | 5/1973 | Kirk, Jr. | 178/5.1 |

*Primary Examiner*—George H. Libman

*Attorney, Agent, or Firm*—Kinzer, Plyer, Dorn & McEachran

[57] ABSTRACT

A cable television converter which converts less than all of the plurality of channels available at its input and thus selectively provides less than all of the available channels of programming to a TV set.

7 Claims, 1 Drawing Figure

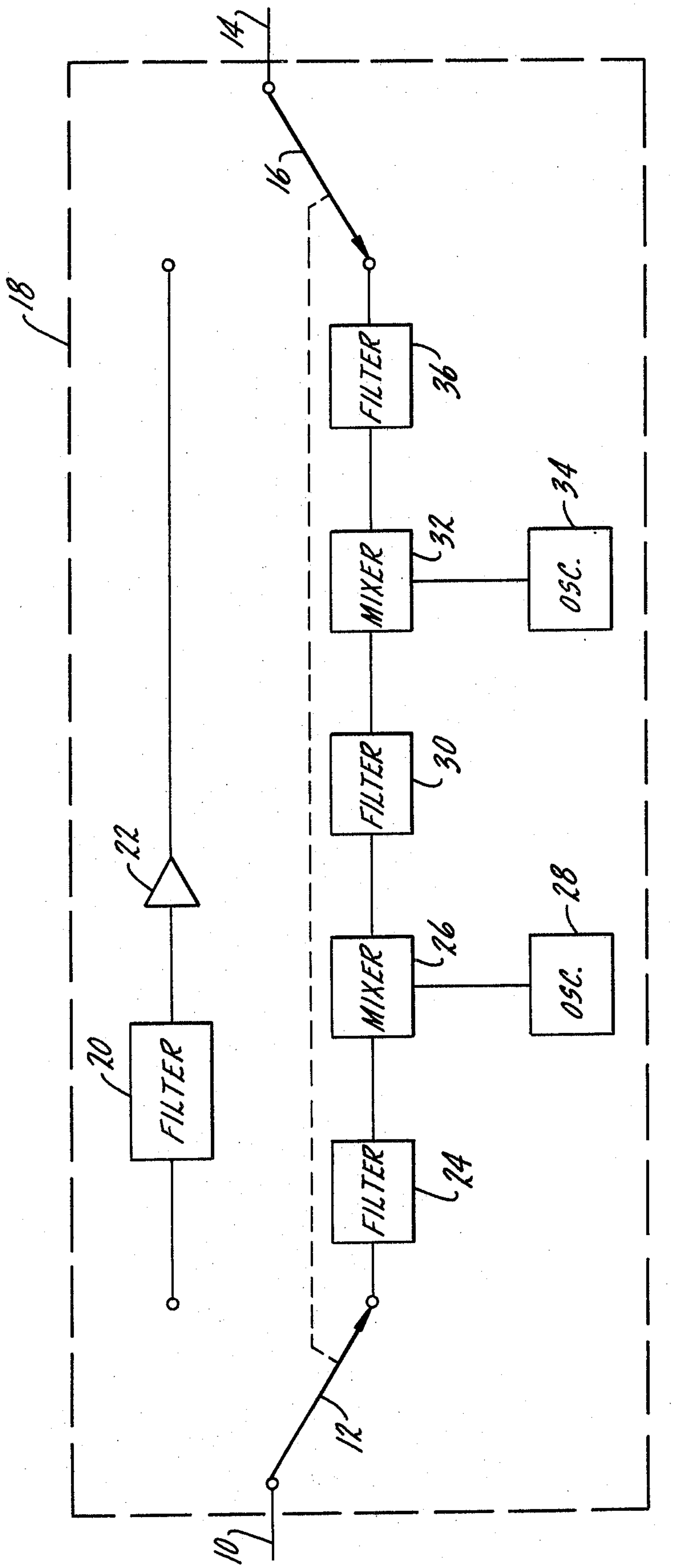
FILTER
MIXER
OSC.
FILTER
MIXER
OSC.
FILTER
FILTER
10
12
14
16
18
20
22
24
26
28
30
32
34
36

APPARATUS FOR CONVERTING SELECTED CHANNELS

SUMMARY OF THE INVENTION

The present invention relates to cable television and in particular to a means for providing subscription television in which only predetermined channels, less than all of the available channels on the cable, can be viewed at a particular subscriber's location.

A primary purpose of the invention is a cable TV converter in which the oscillator frequency is set to convert less than all of the available programming on the cable.

Another purpose is a cable TV converter of the type described in which either or both of the top and bottom channels in a band of channels is converted at the option of the subscriber.

Another purpose is a cable TV converter which provides one or more channels.

Other purposes will appear in the ensuing specification, drawings and claims.

BRIEF DESCRIPTION OF THE DRAWINGS

The invention is illustrated diagrammatically in the attached block diagram illustrating a preferred form of the invention.

DESCRIPTION OF THE PREFERRED EMBODIMENT

The present invention relates to the field of cable television and in particular to a system for subscription television. As an example, in a subscription system there may be one channel devoted to sports, a second channel devoted to movies and intermediate channels which are not necessarily of high interest, for example, stock market reports, local shopping news, etc., but yet which a subscriber would take if they were free. Both the sports channel and the movie channel are only available on a subscription basis. If the subscriber takes both the sports and the movies, as an example, then the low interest channels are available at no additional cost.

The converter of the present invention can block convert a plurality of contiguous TV channels, for example those channels in the mid band and commonly known as channels A through G which cover the frequency band of 120 Mhz to 162 Mhz. Assuming that it is desirable to block convert channels A through G to channels 7–13 which can be seen on a conventional VHF TV set, channel G, as an example, may be reserved for sports on a subscription basis and channel A may be reserved for movie, again on a subscription basis. In one application of the invention the block conversion of channels A to G is so controlled by one of the local oscillators that only channel G will be converted to a frequency usable in the VHF receiver. In another application, only channel A will be converted to a frequency which is usable in the VHF receiver. In a third use of the invention, all of channels A through G will be block converted to frequencies usable in the VHF receiver. In this case, the subscriber is paying for the sports channel and the movie channel, and the intermediate channels are provided at no additional expense.

In the drawing, a cable input is indicated at 10 and is connected to a converter indicated generally at 18. A switch 12 is arranged to place the block converter in operation or to directly connect the available free programming, on the cable to the receiver, the input of which is indicated at 14. A switch 16 will be operated simultaneously with the switch 12 to connect the receiver input 14 either directly to the cable or through the block converter.

When the switches 12 and 16 are in position to bypass the block converter, the programming on the cable is directed through a filter 20 and an amplifier 22 directly to the receiver input 14.

The block converter includes an input band pass filter 24 which is connected to a first mixer 26. The mixer 26 is connected to a first oscillator 28 with the output of the mixer 26 being connected to an intermediate band pass filter 30. The output from the intermediate filter 30 is connected to a second mixer 32 which receives a signal from a second oscillator 34. The output from the mixer 32 is connected to an output band pass filter 36 which in turn is connected to the switch 16.

Assuming a cable system in which the subscription programming is on channels A through G operating in the frequency band of 120 Mhz to 162 Mhz, the input band pass filter 24 will have a pass band of 120 Mhz to 162 Mhz. If only channel A is to be shown on the receiver and the subscriber has chosen and paid for this option only, oscillator 28 will have a frequency of 614 Mhz. The intermediate band pass filter 30 will have a pass band of 488 Mhz to 530 Mhz and the output band pass filter 36 will have a frequency band of 174 Mhz to 216 Mhz. Oscillator 34 will have a fixed frequency of 704 Mhz. Note that all three filters have the same band width, 42 Mhz.

With oscillator 28 having a frequency of 614 Mhz, the output of the mixer 26 will be a frequency band of 452 Mhz to 494 Mhz containing seven 6 Mhz TV channels. The intermediate filter 30 has a pass band of from 488 Mhz to 530 Mhz and thus only the top channel, or channel A, will be passed by the filter 30. The other channels in the group will be effectively removed at this point. The second oscillator 34 having a frequency of 704 Mhz will convert channel A, in the frequency band of 488 Mhz to 494 Mhz, to a frequency band of 210 Mhz to 216 Mhz which can be passed by the output filter 36 directly to the receiver input 14. Thus, all channels, except channel A, are effectively removed by the converter and only channel A can be seen by the subscriber.

If the subscriber chooses an option whereby only channel G can be received, oscillator 28 will have a frequency of 686 Mhz which has the effective result of only providing channel G at the output of band pass filter 36. In this case, the output of mixer 26 will be a frequency band of 524 Mhz to 566 Mhz with only channel G, at a frequency band of 524 Mhz to 530 Mhz being passed by the intermediate filter 30.

If the subscriber should choose the option of having both channel A and channel G, he is automatically given the intermediate channels without additional cost. In this case, oscillator 28 will have a frequency of 650 Mhz which will effectively block convert all channels within the band of channels A through G to a frequency usable in the receiver input 14.

The invention should not be limited to a cable TV converter in which channels A through G are converted to frequencies usable in the receiver. Groups of contiguous channels above channel 13 or groups of contiguous channels having frequencies below that of channel 2 may be satisfactory in some applications. What is important is to provide an arrangement whereby less than all of the available programming on the cable is converted to a frequency band which is usable at the VHF receiver. By less than all the channels I am referring to less than all of the programming which may be available if the subscriber chooses to pay for it all. In some applications the subscription channels may be contiguous, rather than separated as described herein.

What the present invention provides is a system in which the subscriber has a number of options. In one option he may receive only one channel, for a particular type of subscription programming. In a second option he may receive a different channel, again for a particular type of subscription programming. In a third option, he may receive all of the subscription channels and all of the intermediate channels without additional fees.

If the subscriber chooses either one of the two subscription channels his converter will be arranged at the factory such that oscillator 28 will only convert a particular channel. In the event the subscriber chooses both subscription options and therefore also receives the intermediate free channels, his converter would be arranged at the factory so that he can select, by means of a conventional switch, any one of the three options he has purchased. In such an instance in which the subscriber selects a single option, his converter will be arranged to operate in a manner to only convert a channel in accordance with that particular option.

The invention has been described as using a variable first oscillator and a fixed frequency second oscillator. This can be reversed and the second oscillator can be variable, although this arrangement does not provide as high a degree of selectivity. Also, instead of having only a single channel at the high or low end of the band as the subscription channels, there may be two or more. What is important is that less than all of the available channels be converted as described.

Whereas the preferred form of the invention has been shown and described herein, it should be realized that there may be many modifications, substitutions and alterations hereto.

I claim:

1. A cable TV converter including an input band pass filter tuned to pass a plurality of contiguous TV channels, a first mixer connected to said filter, and a first oscillator connected to said first mixer, an intermediate band pass filter connected to the output of said first mixer, said intermediate filter having generally the same band width as said first filter, a second mixer connected to the ouput of said intermediate filter and a second oscillator connected to said second mixer, and an output band pass filter connected to said second mixer and having a band width the same as said input and intermediate band pass filters, said first oscillator having a frequency such that less than all of said plurality of TV channels present at the output of said first mixer are passed by said intermediate band pass filter.

2. The cable TV converter of claim 1 further characterized in that the frequency of said first oscillator is such that only a single channel of the plurality of channels present at the output of the first mixer are passed by the intermediate band pass filter.

3. The cable TV converter of claim 2 further characterized in that the frequency of the first oscillator is such that the highest channel present at the output of the first mixer will be passed by the intermediate band pass filter.

4. The cable TV converter of claim 2 further characterized in that the frequency of the first oscillator is such that only the lowest channel present at the output of the first mixer will be passed by the intermediate band pass filter.

5. The cable TV converter of claim 1 further characterized in that said second oscillator has a fixed frequency.

6. The cable TV converter of claim 1 further characterized in that the output of said second mixer is a frequency band usable in a conventional Tv set.

7. A cable TV converter including an input band pass filter tuned to pass a plurality of contiguous TV channels, a first mixer connected to said filter, and a first oscillator connected to said first mixer, an intermediate band pass filter connected to the output of said first mixer, said intermediate filter having generally the same band width as said first filter, a second mixer connected to the output of said intermediate filter and a second oscillator connected to said second mixer, and an output band pass filter connected to said second mixer and having a band width the same as said input and intermediate band pass filters, one of said oscillators having a frequency such that less than all of said plurality of TV channels present at the output of its associated mixer are passed by the following band pass filter.

* * * * *